Nov. 10, 1936.    E. BIANCALANA    2,060,605
REFRIGERATION FOR MEAT GRINDERS OR LIKE DEVICES
Filed Dec. 1, 1934    3 Sheets-Sheet 1

INVENTOR.
Eugene Biancalana
BY
Williams, Rich & Morse
ATTORNEYS

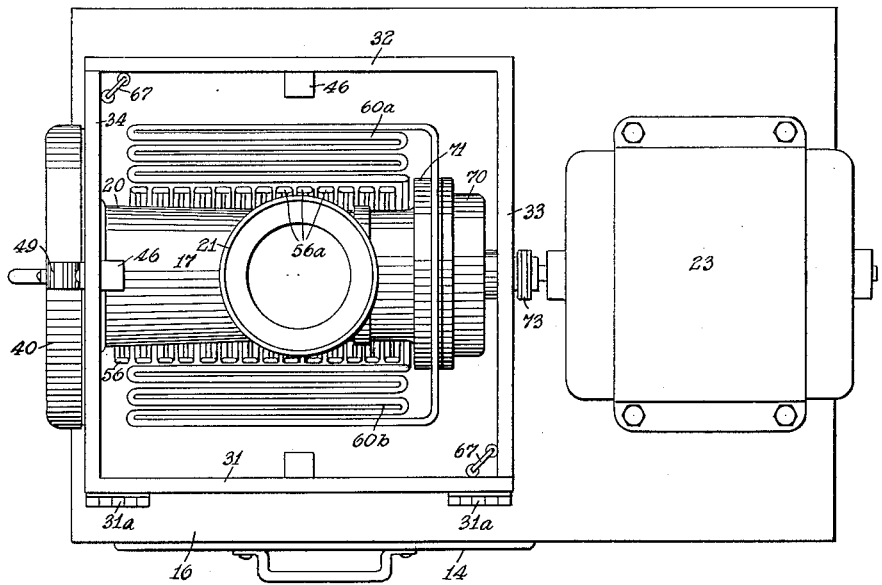
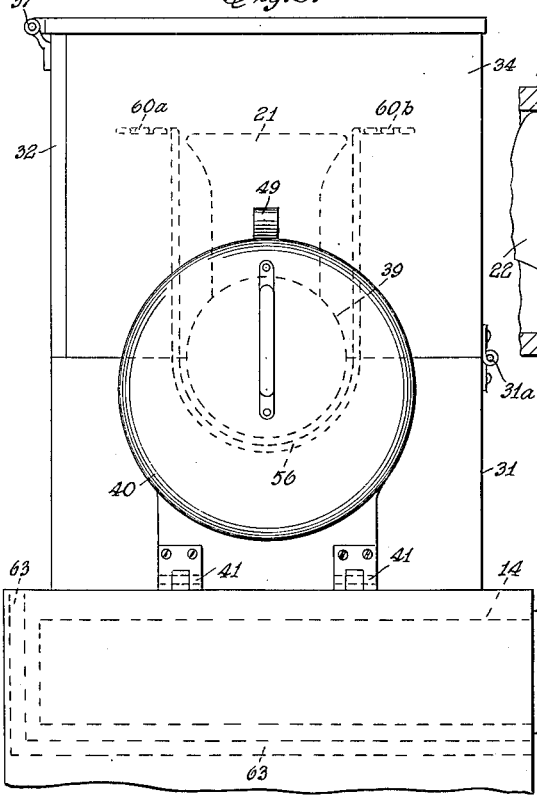
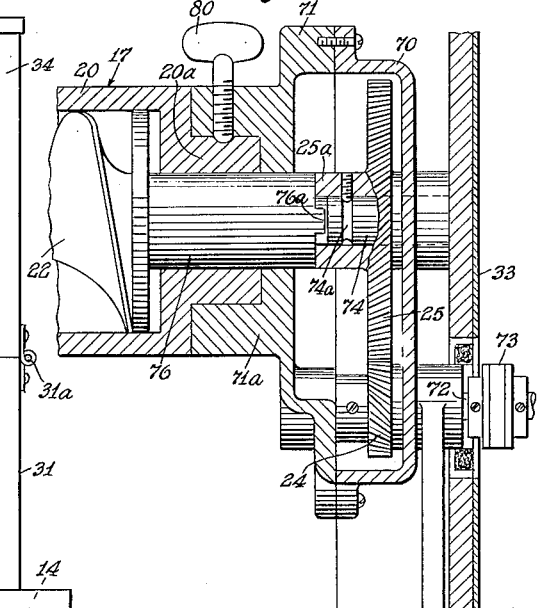

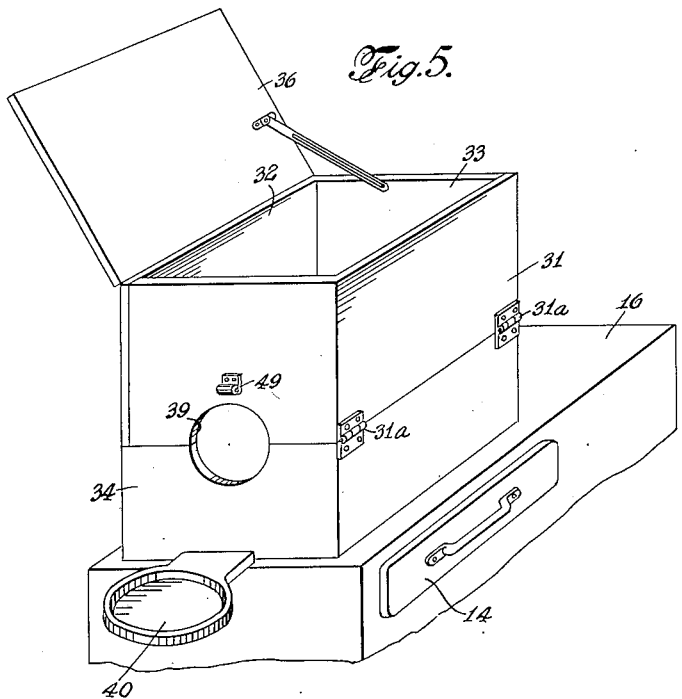
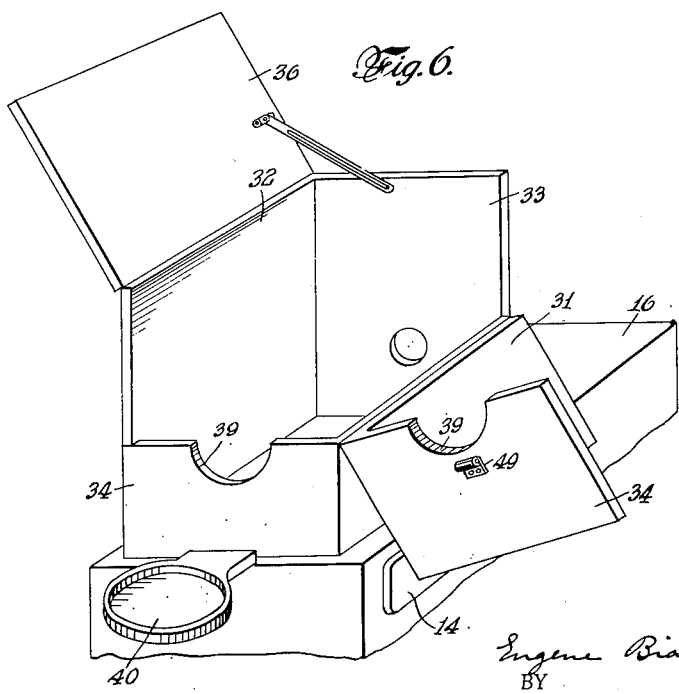

Patented Nov. 10, 1936

2,060,605

UNITED STATES PATENT OFFICE 2,060,605

REFRIGERATION FOR MEAT GRINDERS OR LIKE DEVICES

Eugene Biancalana, Richmond Hill, N. Y.

Application December 1, 1934, Serial No. 755,523

11 Claims. (Cl. 62—1)

My invention relates in general to refrigerating means and has for its object to provide means for maintaining meat grinders or like devices at the low temperature necessary to insure that the meat or other material treated will be cut instead of crushed and will not be subjected to deteriorating effects by a rise in temperature by reason of division into fine particles, as well as to the heat generated therein due to the friction created by the operation of the machine thereon. More particularly my invention provides an improved construction of refrigerating unit which will normally completely enclose a device of this character and yet enable it to be readily and continuously operated without substantial rise in temperature. By my invention meat may be ground or chopped at a lower temperature than has heretofore been possible without in any way losing its natural color or sweetness. Other distinct advantages are also obtained, all of which will be hereinafter stated.

An object of my invention is to provide a refrigerating unit adapted to so enclose a meat-cutting device that it is effectively chilled while in use and which permits it to be readily removed for inspection, cleaning and repair.

Still another object of my invention is to provide as an assembled unit a cabinet containing a meat-cutting device, the elements necessary for producing refrigeration, and the necessary storage facilities and adjuncts for convenience of the operator.

These and other objects and features of my invention will become apparent in the following description taken in connection with the accompanying drawings in which:

Fig. 2 is a top view of said unit, the horizontal tray and the upper lid or cover being removed;

Fig. 3 is a side view of the upper cabinet section looking from the left in Figs. 2 and 3;

Fig. 4 is an enlarged cross-sectional detail view particularly illustrating the means for removably securing the chopper to the driving mechanism;

Figure 1:
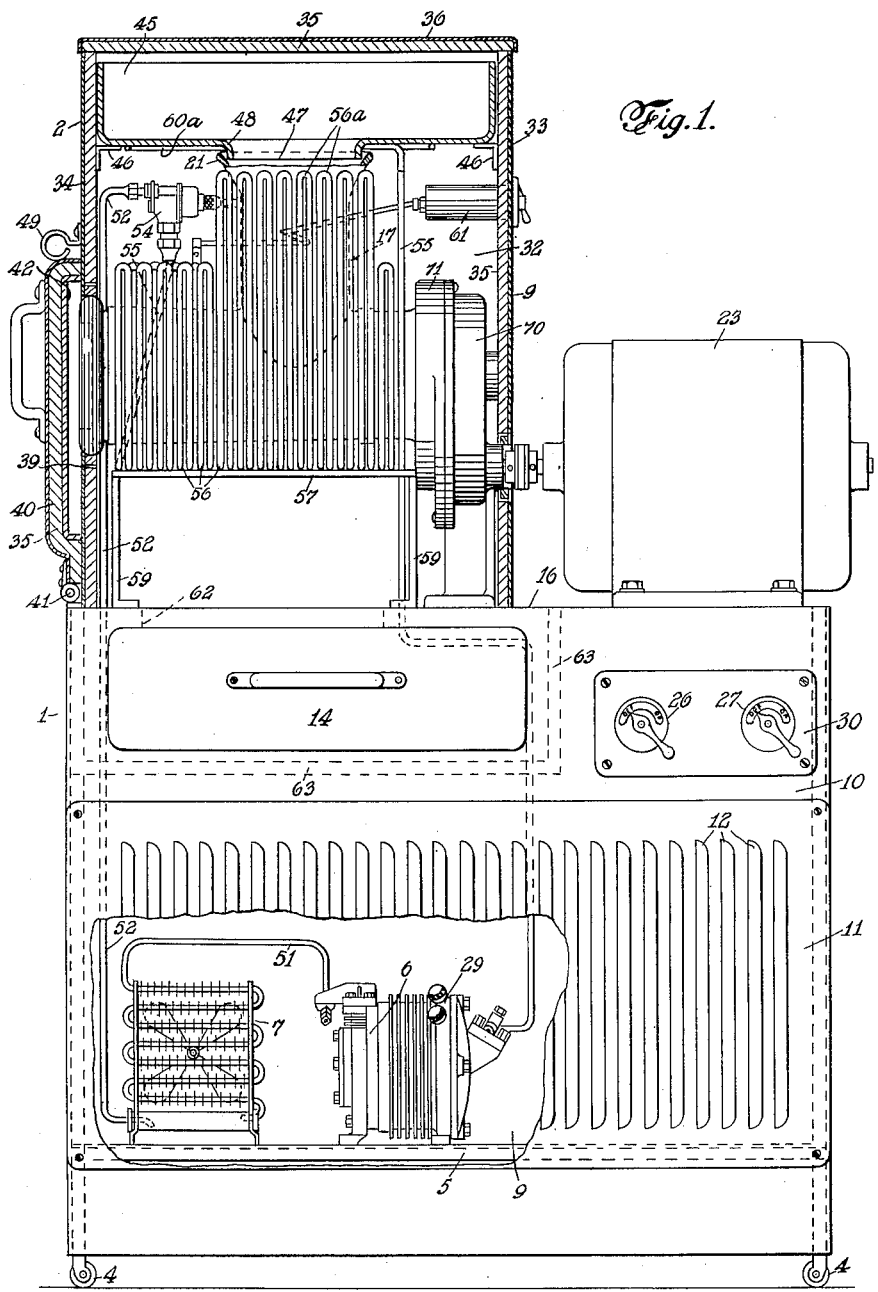
Fig. 1 is a front view of a refrigerating unit as one embodiment of my invention, a portion of the lower cabinet section being broken away and the upper cabinet section shown in section.

Fig. 5 is a perspective view of the upper cabinet section with interior parts removed, particularly illustrating the upper lid and side door in the open positions which they assume when the chopper is in operation; and Fig. 6 is a similar view particularly illustrating the movable portion of the upper cabinet section in open position which it assumes to facilitate access to the interior of said upper section.

Similar reference numerals indicate similar parts.

My improved construction of refrigerating unit as shown in the drawings comprises a housing cabinet having a lower section 1 and an upper section 2, which cabinet may be made of reinforced sheet metal in the manner well understood in the art of cabinet making. The lower cabinet section 1 is mounted on casters 4 and has an interior frame work of angle pieces 5 for securing the refrigerating apparatus thereto. The latter comprises a motor-driven compressor 6 and an air-cooled condenser 7 and is accessible through an opening 9 formed in the front wall 10, which is normally closed by a removable panel 11 provided with suitable ventilating apertures 12. A drawer 14 is adapted for sliding movement through the upper portion of the wall 10.

The upper cabinet section 2 extends above the top 16 of the lower section 1 and completely encloses the meat-chopper 17 and its refrigerating coils to be hereinafter more particularly described. As shown, the meat chopper comprises the usual feed cylinder 20 and the supply hopper 21 communicating therewith at its inner end, the cylinder 20 containing the feed worm 22 which is driven by the motor 23 through the speed-reduction gears 24 and 25 (Fig. 4). The motor 23 is mounted on the top 16 outside of the upper section 2 of the cabinet. The switches 26 and 27, respectively controlling the motor 23 and the condenser motor 29, are mounted on a plate 30, secured in any convenient position and preferably mounted on the wall 10.

The upper cabinet section 2 is preferably rectangular and is formed by the front and rear walls 31, 32, and the right and left hand side walls 33, 34, all of which extend a short distance above the hopper 21 and are interiorly lined with insulation 35, such as cork. A normally closed top cover or lid 36 provides access to the hopper 21 and is secured by hinges 37 to the rear wall 32 to permit it to be swung open to a position completely out of the way of the operator's movements (see Fig. 5). The cylinder 20 protrudes at its discharge end through an opening 39 provided in the side wall 34, which opening 39 is normally covered or closed by a door 40 pivotally secured at its lower edge by hinges 41 to the wall 34 and serving, when lowered into a horizontal position, to receive the material discharged from the chopper. Any suitable means, such as a spring latch 49, may be employed for normally holding the door 40 closed. Both the lid 36 and the door 40 are lined with insulation 35, the door 40 being preferably formed with an interior recess into which a removable tray 42, of porcelain or like material, may be fitted.

In the top of the upper cabinet section 2 above the chopper, I provide another tray 45, of porcelain or like material, which is removably carried by brackets or angle pieces 46 and is provided with a central opening 47 through which meat may be introduced into the hopper 21, the opening 47 being preferably bounded by a circular lip 48 extending slightly into the hopper 21. This tray 45 may be used to store meat ready for introduction into the hopper 21, and in addition to serving as a convenient means of feeding material into the chopper, it also serves to prevent the escape of chilled air from the interior of the cabinet and the ingress of any considerable volume of surrounding air into the vicinity of the chopper, when the lid 36 is opened and material is being fed into the hopper.

In order to accomplish the objects desired I have provided a novel arrangement of the coils of the refrigerating unit, permitting the chopper to be easily inserted and removed. Referring now to Fig. 1, it will be seen that a pipe 51 connects the outlet end of the compressor 6 to the inlet end of the condenser 7, the vaporized refrigerant being led from the outlet end of the condenser 7 by a pipe 52 extending upwardly into the upper section 2 of the cabinet. The pipe 52 at its upper end is connected to a pressure valve 54, adapted in the usual manner to control the operation of the compression motor 29 and preferably located adjacent the rear wall 32. A pipe 55 leads from the outlet end of the valve 54 to the refrigerating coils 56. The latter are formed by causing the pipe 55 to follow a sinuous path at each side and under the bottom of the chopping device, thus providing a U-shaped enclosing unit (see Figs. 1 and 3). A ledge 57 assists in supporting the coils 56 in place and is carried by brackets 59 secured to the top 16 of the lower cabinet section. As shown, certain of the coils 56, namely, 56a, extend above the others on opposite sides of the hopper 21 to maintain this passageway thoroughly chilled. From the coils 56 the pipe 55 continues to the refrigerating loops for the tray 45, two sets of such coils, namely, 60a and 60b, being shown. The coils 60b are formed by causing the pipe 55 to follow a sinuous path immediately below the tray 45 on one side of the hopper 21, the pipe 55 being then extended rearwardly to similarly form the coils 60a on the opposite side of the hopper 21. From the coils 60a the pipe 55 extends downwardly through the top 16 into the lower cabinet section 1, the lower end of the pipe 55 being connected to the inlet end of the compressor 6. A temperature control device 61, also adapted to control the operation of the compressor motor 29 contacts thermally with one of the coils 56 and is mounted for operation on the side wall 33.

The drawer 14 communicates with the upper cabinet section 2 by means of a large opening 62 formed in the top 16, insulation 63 being shown extending along its rear, sides and bottom. Other insulation (not shown) may also be provided in the top 16 and along the edges of the opening through which the drawer 14 operates, the front portion of the drawer 14 being constructed for its insulation in any suitable manner known in the art of refrigeration. Because of the low temperature maintained in the drawer 14, it may be advantageously employed for storing meat or other perishable foods.

To facilitate access to the interior of the upper cabinet section 2, a portion thereof may be made removable and a convenient arrangement which I have determined in practice to accomplish this object is to divide the walls 31 and 34 along the plane containing the axis of the meat chopper feed cylinder 20. That is, the upper portions of the walls 31 and 34 above said plane are made separate from the remainder of the cabinet section 2, the opening 39 being in part formed by the movable portion of the wall 34 and in part formed by the fixed portion of the wall 34. Preferably the movable portion of the wall 31 is pivotally secured by hinges 31a to the fixed portion of the wall 31 so that the entire movable portion of the cabinet section 2 can be moved outwardly into the open position shown in Fig. 6. This cabinet construction is particularly intended to facilitate the positioning of the chopper 17 within the coils 56 or its removal therefrom, but also provides free access to the temperature controlling coils and other interior parts for cleaning or other purposes. Any suitable securing devices, such as hooks 67, may be provided for normally securing the movable portion of the cabinet section 2 to the fixed portion.

Referring to Fig. 4, the gears 24 and 25 are operated in a metal casing comprising two portions 70 and 71, rigidly secured to one another and to the top 16 of the lower cabinet section, the gear 24 being keyed to a stub shaft 72 extending through the casing portion 70 and cabinet wall 33 to a coupling 73 connecting it to the shaft of the motor 23 and the gear 25 being rotatably mounted on a stud 74 fixed to the casing portion 70. A screw 75 extends through the hub 25a of the gear 25 into a circular groove 74a in the stud 74 to prevent lateral displacement of the gear 25. The casing portion 71 is provided with a cylindrical extension 71a through which the shaft 76 carrying the feed-worm 22 is introduced for removably securing the chopper 17 in position for operation by the driving means described, the shaft 76 being provided with a rectangular extension 76a adapted to engage slots formed in the hub 25a and the cylinder 20 being provided with an extension 20a adapted to engage an enlarged opening formed in the extension 71a. A thumbscrew 80 normally secures the chopper 17 in its operative position.

From the foregoing description it is apparent that, with the tray 45 removed from the cabinet and with the movable portion of the cabinet section 2 in its lowered position, the chopper 17 may be readily moved into and out of operative position, either horizontally between the vertical portions of the coils 56 or vertically between the coils 60a and 60b.

It is to be particularly noted that the complete extent of the chopper 17 is effectively chilled at all times. Meat introduced therein is therefore caused to pass through a chilled passageway, including both the supply hopper 21 and cylinder 20, prior to being brought in contact with the cutting blades which are also chilled. Meat may be left in the hopper 21 and will not deteriorate, meat waste being therefore entirely eliminated. The usual pusher or feeding stick (not shown) employed for forcing meat into the hopper is normally carried in the tray 45 and is thus at all times maintained cool. The chopper 17 as a whole being at all times maintained in chilled

What is claimed is:

1. A refrigerating unit adapted to contain a meat-cutting device having a feed-cylinder and a supply-hopper, comprising a cabinet for normally completely enclosing the device having an upper lid providing access to the hopper and a side door normally closing an opening formed in one of the side walls in registration with the discharge end of the cylinder, said door being pivotally mounted at its lower edge for outward movement into a position to receive meat from the discharge end of the cylinder, and refrigerating coils in said cabinet disposed adjacent the device.

2. A refrigerating unit adapted to contain a meat-cutting device having a feed-cylinder and a supply-hopper, comprising a cabinet for normally completely enclosing the device having an upper lid providing access to the hopper and a side door normally closing an opening formed in one of the side walls in registration with the discharge end of the cylinder, said door being provided with an inner tray and being pivotally mounted at its lower edge for outward movement into a position to receive meat from the discharge end of the cylinder on said tray, and refrigerating coils disposed adjacent the device.

3. A refrigerating unit for a meat-cutting device having a feed-cylinder and a supply hopper, comprising a cabinet into which the device may be removably positioned and normally completely enclosed, said cabinet having an upper lid providing access to the hopper and a side door normally closing an opening formed in one of the side walls in registration with the discharge end of the cylinder, said door being pivotally mounted at its lower edge for outward movement into a position to receive meat from the discharge end of the cylinder, and refrigerating coils in said cabinet forming a U-shaped enclosure contiguous to the bottom and sides of the device.

4. A refrigerating unit for a meat-cutting device having a feed-cylinder and a supply hopper, comprising a cabinet into which the device may be removably positioned and normally completely enclosed, said cabinet having an upper lid providing access to the hopper and a side door normally closing an opening formed in one of the side walls in registration with the discharge end of the cylinder, said door being pivotally mounted at its lower edge for outward movement into a position to receive meat from the discharge end of the cylinder, and refrigerating coils in said cabinet extending along the bottom and sides of the cylinder and the sides of the hopper.

5. A refrigerating unit for a meat-cutting device having a feed-cylinder and a supply-hopper, comprising a cabinet into which the device may be removably positioned and normally completely enclosed, said cabinet having an upper lid providing access to the hopper and a side door normally closing an opening registering with the discharge end of the cylinder, said door being pivotally mounted at its lower edge for outward movement into a position to receive meat from the discharge end of the cylinder, a tray removably supported in the upper portion of said cabinet and having an opening registering with the upper end of the hopper, refrigerating coils in said cabinet forming a U-shaped enclosure contiguous to the bottom and sides of the device, and two sets of other refrigerating coils for said tray between which the device may be moved vertically into and out of operative position.

6. A refrigerating unit for a meat-cutting device having a feed-cylinder and a supply hopper, comprising a cabinet into which the device may be removably positioned and normally completely enclosed, said cabinet having an upper lid providing access to the hopper and a side door normally closing an opening formed in one of the side walls in registration with the discharge end of the cylinder, said door being pivotally mounted at its lower edge for outward movement into a position to receive meat from the discharge end of the cylinder, and refrigerating coils in said cabinet forming a U-shaped enclosure contiguous to the bottom and sides of the device, said cabinet having a separately formed section adapted for outward pivotal movement to expose said coils.

7. A refrigerating unit for a meat-cutting device having a feed-cylinder and a supply-hopper, comprising a cabinet into which the device may be removably positioned and normally completely enclosed, said cabinet having an upper lid pivotally mounted at its rear edge to provide ready access to the hopper and a side door normally closing an opening formed in one of the side walls in registration with the discharge end of the cylinder, said door being pivotally mounted at its lower edge for outward movement into a position to receive meat from the discharge end of the cylinder, and refrigerating coils in said cabinet forming a U-shaped enclosure contiguous to the bottom and sides of the device, said cabinet having a separately formed movable portion formed by upper portions of the front wall and said one of the side walls, said separately formed cabinet portion being pivotally mounted at the lower edge of the upper front wall portion for outward movement into a position exposing said coils, said side opening being partly formed in the upper side wall portion.

8. A refrigerating unit for a meat-cutting device having a feed-cylinder and a supply hopper, comprising a cabinet into which the device may be removably positioned and normally completely enclosed, said cabinet having an upper lid providing access to the hopper and a side door normally closing an opening formed in one of the side walls in registration with the discharge end of the cylinder, said door being pivotally mounted at its lower edge for outward movement into a position to receive meat from the discharge end of the cylinder, refrigerating coils in said cabinet forming a U-shaped enclosure contiguous to the bottom and sides of the device, means in part located in said cabinet for driving the device, and means for removably connecting the device to said driving means.

9. A refrigerated food-cutting device comprising, in combination, a cutting device having a supply hopper, a thermally insulated cabinet within which said device is positioned and through one wall of which it is adapted to discharge, a tray located wholly within said cabinet and above said device and provided with an opening registering with said hopper, a lid on said cabinet giving access to said tray, and refrigerating coils so located as to be contiguous to said device and below said tray.

10. A refrigerated food-cutting device comprising, in combination, a thermally insulated cabinet having an upper lid and an opening on one side, a cutting device positioned wholly within said cabinet and having its discharge end in registration with said opening, cooling coils so disposed within said cabinet and about said device as to permit said device to be readily removed from said coils, driving means for said device partly within said cabinet, and means for removably engaging said device with said driving means.

11. A refrigerated food-cutting device comprising, in combination, a thermally insulated cabinet having an upper lid and an opening on one side, a thermally insulated cover for said opening, a cutting device positioned wholly within said cabinet and having its discharge end in registration with said opening, cooling coils so disposed within said cabinet and about said device as to permit said device to be readily removed from said coils, driving means for said device partly within said cabinet, and means for removably engaging said device with said driving means.

EUGENE BIANCALANA.